(12) United States Patent
Parrish

(10) Patent No.: US 11,193,413 B2
(45) Date of Patent: Dec. 7, 2021

(54) EXHAUST AFTERTREATMENT SYSTEM WITH VIRTUAL TEMPERATURE DETERMINATION AND CONTROL

(71) Applicant: Faurecia Emissions Control Technologies, USA, LLC, Columbus, IN (US)

(72) Inventor: Tony Parrish, Columbus, IN (US)

(73) Assignee: Faurecia Emissions Control Technologies, USA, LLC, Columbus, IN (US)

(*) Notice: Subject to any disclaimer, the term of this patent is extended or adjusted under 35 U.S.C. 154(b) by 0 days.

(21) Appl. No.: 16/711,729

(22) Filed: Dec. 12, 2019

(65) Prior Publication Data
US 2021/0180493 A1    Jun. 17, 2021

(51) Int. Cl.
| F01N 3/20 | (2006.01) |
| F01N 3/08 | (2006.01) |
| F01N 3/035 | (2006.01) |
| F01N 3/029 | (2006.01) |

(52) U.S. Cl.
CPC ............ F01N 3/208 (2013.01); F01N 3/035 (2013.01); F01N 3/0807 (2013.01); *F01N 3/0296* (2013.01)

(58) Field of Classification Search
CPC ...... F01N 3/208; F01N 3/2066; F01N 3/0807; F01N 3/035; F01N 3/0296
See application file for complete search history.

(56) References Cited

U.S. PATENT DOCUMENTS

| 4,486,270 | A | 12/1984 | Kaasenbrood |
| 5,240,688 | A | 8/1993 | Von Harpe |
| 5,590,521 | A | 1/1997 | Schnaibel et al. |
| 5,827,490 | A | 10/1998 | Jones |
| 6,077,491 | A | 6/2000 | Cooper |
| 7,449,162 | B2 | 11/2008 | Schaller |
| 7,595,034 | B2 | 9/2009 | Nissinen |
| 7,984,609 | B2 | 7/2011 | Doering |
| 8,100,191 | B2 | 1/2012 | Beheshti |
| 8,413,427 | B2 | 4/2013 | Mullins |
| 8,418,443 | B2 | 4/2013 | Millet |
| 8,518,354 | B2 | 8/2013 | Ayyappan |

(Continued)

FOREIGN PATENT DOCUMENTS

| CH | 707551 | 8/2014 |
| CN | 104265422 | 1/2015 |

(Continued)

OTHER PUBLICATIONS

Zhanfeng Qi, Shusen Li, Xiuli Guo, "Development, Application and Direction of Development of Urea-SCR", International Journal of Multimedia and Ubiquitous Engineering, 2016, pp. 131-142, vol. 11, Issue No. 2016.

(Continued)

*Primary Examiner* — Phutthiwat Wongwian
*Assistant Examiner* — Diem T Tran
(74) *Attorney, Agent, or Firm* — Barnes & Thornburg LLP

(57) ABSTRACT

An exhaust aftertreatment system for use with over-the-road vehicle is disclosed. The exhaust aftertreatment system includes a reducing agent mixer with a mixing can and a flash-boil doser configured to inject heated and pressurized reducing agent into the mixing can for distribution throughout exhaust gases passed through the mixing can.

18 Claims, 3 Drawing Sheets

(56) References Cited

U.S. PATENT DOCUMENTS

| | | |
|---|---|---|
| 8,763,372 B2 | 7/2014 | Pohl |
| 8,800,276 B2 | 8/2014 | Levin |
| 8,893,484 B2 | 11/2014 | Park |
| 8,967,484 B2 | 3/2015 | Nishizawa |
| 8,980,181 B2 | 3/2015 | Qi |
| 9,072,850 B2 | 7/2015 | Mcintosh |
| 9,341,100 B2 | 5/2016 | Petry |
| 9,512,760 B2 | 12/2016 | Clayton, Jr. |
| 9,598,977 B2 | 3/2017 | Meyer |
| 9,683,447 B2 | 6/2017 | Gentile |
| 9,687,782 B1 | 6/2017 | Miao |
| 9,732,650 B2 | 8/2017 | Tomita |
| 9,771,850 B2 | 9/2017 | Henry |
| 10,337,380 B2 | 7/2019 | Willats |
| 2003/0079467 A1 | 5/2003 | Liu |
| 2005/0045179 A1 | 3/2005 | Faison |
| 2006/0218902 A1 | 10/2006 | Arellano |
| 2009/0000605 A1* | 1/2009 | Craig ............... F23D 91/02 123/549 |
| 2009/0031713 A1 | 2/2009 | Suzuki |
| 2009/0223211 A1 | 9/2009 | Brueck |
| 2009/0294552 A1 | 12/2009 | Trapasso |
| 2011/0064634 A1* | 3/2011 | Enos ............... B01D 53/62 423/220 |
| 2012/0322012 A1 | 12/2012 | Tsumagari |
| 2013/0186068 A1* | 7/2013 | Liljestrand ........... F01N 3/08 60/274 |
| 2013/0232956 A1 | 9/2013 | Loman et al. |
| 2013/0239549 A1 | 9/2013 | Henry |
| 2013/0259755 A1 | 10/2013 | Kim |
| 2014/0060015 A1* | 3/2014 | Yan ............... F01N 11/00 60/286 |
| 2014/0245722 A1* | 9/2014 | Naik ............... F01N 3/2066 60/286 |
| 2014/0314644 A1 | 10/2014 | Bugos et al. |
| 2014/0363358 A1 | 12/2014 | Udd |
| 2015/0135683 A1 | 5/2015 | Petry |
| 2015/0240689 A1* | 8/2015 | Guilbaud ........... F01N 13/10 60/295 |
| 2015/0308321 A1* | 10/2015 | Zhang ............... F01N 3/208 60/286 |
| 2015/0315950 A1 | 11/2015 | Hagimoto |
| 2016/0017780 A1 | 1/2016 | Kinugawa |
| 2016/0053652 A1 | 2/2016 | Van Vuuren |
| 2016/0061083 A1 | 3/2016 | Pramas |
| 2017/0122169 A1 | 5/2017 | Ettireddy |
| 2017/0198621 A1 | 7/2017 | Gaiser |
| 2017/0204762 A1 | 7/2017 | Kotrba |
| 2018/0080360 A1 | 3/2018 | Kurpejovic |
| 2018/0142593 A1 | 5/2018 | Wang et al. |
| 2019/0383187 A1 | 12/2019 | Sarsen |
| 2020/0131966 A1 | 4/2020 | Jeannerot |

FOREIGN PATENT DOCUMENTS

| | | |
|---|---|---|
| DE | 102009005012 | 7/2010 |
| DE | 102017101310 | 8/2017 |
| DE | 102018209405 | 12/2019 |
| EP | 2140117 | 1/2010 |
| EP | 2167860 | 3/2010 |
| EP | 2302276 | 3/2011 |
| EP | 2543837 | 1/2013 |
| EP | 2870331 | 5/2015 |
| EP | 3330222 | 6/2018 |
| EP | 3581773 | 12/2019 |
| GB | 2552040 | 1/2018 |
| GB | 2562178 | 11/2018 |
| GB | 2568269 | 5/2019 |
| JP | 2015078643 | 4/2015 |
| JP | 2020139426 | 9/2020 |
| KR | 20170013687 | 2/2017 |
| WO | 199956858 | 11/1999 |
| WO | 2005025725 | 3/2005 |
| WO | 2006087553 | 8/2006 |
| WO | 2007124791 | 11/2007 |
| WO | 2008077587 | 7/2008 |
| WO | 2008108955 | 9/2008 |
| WO | 2013036308 | 3/2013 |
| WO | 2018075061 | 4/2018 |
| WO | 2018100187 | 6/2018 |

OTHER PUBLICATIONS

Tue Johannessen, "Compact ammonia storage systems for fuel-efficient NOX emissions reduction", CTI conference on SCR Systems, Jul. 5, 2010.

Anu Solla, Marten Westerholm, Christer Soderstrom, Kauko Tormonen, "Effect of Ammonium Formate and Mixtures of Urea and Ammonium Formate on Low Temperature Activity of SCR Systems", SAE International, 2005.

Daniel Peitz, "Investigations on the catalytic decomposition of guanidinium formate, ammonium formate and methanamide as NH3-precuresors for the selective catalytic reduction of NOX", Univeristy of Erlangen-Nuremberg, 2010.

Extended European Search Report for European Appl. No. 19207724.6, dated Feb. 26, 2020, 8 pages.

Extended European Search Report for European Appl. No. 19203355.3, dated Feb. 26, 2020, 9 pages.

Extended European Search Report for European Appl. No. 19207953.1, dated Mar. 13, 2020, 7 pages.

Office Action dated Apr. 3, 2020, for U.S. Appl. No. 16/184,567 (pp. 1-15).

* cited by examiner

EXHAUST AFTERTREATMENT SYSTEM WITH VIRTUAL TEMPERATURE DETERMINATION AND CONTROL

BACKGROUND

The present disclosure relates to exhaust aftertreatment systems for automotive applications, and particularly to mixing devices included in exhaust aftertreatment systems. More particularly, the present disclosure relates to injectors for injecting reducing agents, such as urea solutions, into exhaust streams to mix with the exhaust stream so that chemical reaction between the reducing agent and exhaust gases reduces Nitrous Oxides (NOx) in the exhaust gas.

SUMMARY

An over-the-road vehicle in accordance with the present disclosure includes an internal combustion engine that produces exhaust gases and an exhaust aftertreatment system configured to treat the exhaust gases before releasing them into the atmosphere. The exhaust aftertreatment system may include several components to treat the exhaust gases, such as a diesel oxidation catalyst (DOC), a diesel particulate filter (DPF), and a selective catalytic reduction unit (SCR), a reducing agent mixer, and a heating system.

The reducing agent mixer includes a mixing can that defines at least a portion of an exhaust passageway for receiving the exhaust gases and a flash-boil doser mounted to the mixing can. The flash-boil doser is configured to inject reducing agent into the mixing can through an injection aperture formed in the mixing can at a predetermined flow rate with each injection pulse. The heating system is configured to manage the temperatures within the reducing agent mixer.

The heating system includes at least one heater arranged within the flash-boil doser and a heating system controller coupled to the heater. The heater is configured to heat the reducing agent in the flash-boil doser. The heating system controller is configured to determine a virtual temperature of the reducing agent injected by the flash-boil doser based on measured input parameters outside the flash-boil doser so as to provide a virtual reagent temperature sensor.

The heating system controller is then configured to direct the heater to selectively apply heat to the reducing agent in the flash-boil doser depending upon the virtual temperature to help better control the system. The virtual reagent temperature sensor provided by the heating system controller may also eliminate any potential leak paths in the flash-boil doser, reduce manufacturing costs, and improve the durability and reliability of the flash-boil doser.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION OF THE DRAWINGS

Figure 1:
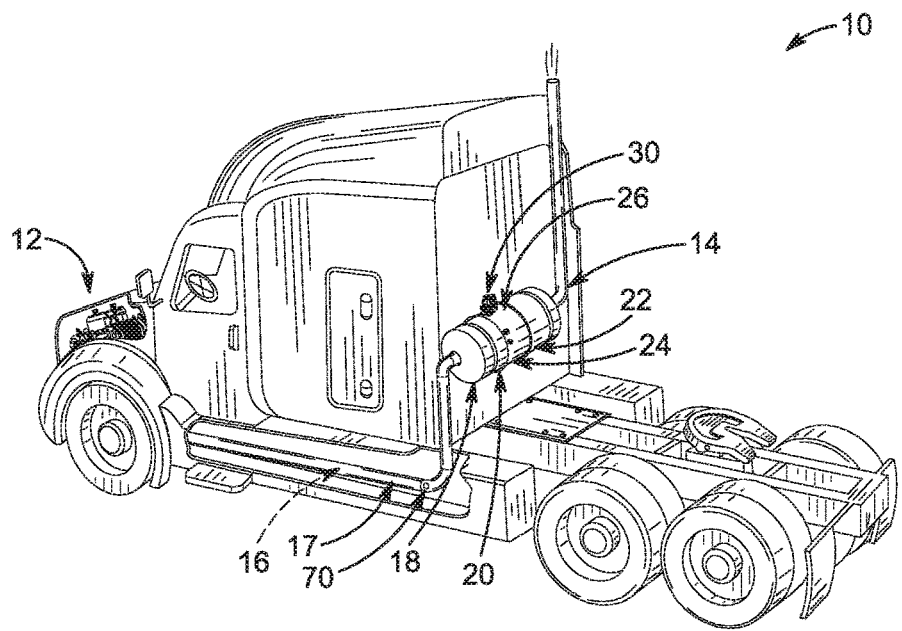
FIG. 1 is a perspective view of an over-the-road automotive vehicle including an internal combustion engine and an exhaust aftertreatment system with a reducing agent mixer configured to deliver a reducing agent into the engine exhaust gases and a heating system configured to manage temperatures within the reducing agent mixer and other components of the exhaust aftertreatment system.

An illustrative over-the-road vehicle 10 includes an engine 12 an exhaust aftertreatment system 14 in accordance with the present disclosure as shown, for example, in FIG. 1. The engine 12 is, illustratively, an internal combustion engine 12 configured to combust fuel and discharge exhaust gases that are carried through an exhaust passageway 16 defined by an exhaust conduit 17, treated by the exhaust aftertreatment system 14, and then released into the atmosphere. The exhaust aftertreatment system 14 is configured to reduce various effluents in the exhaust gases, such as, for example, nitrogen oxides (NOx), before the exhaust gases are released to the atmosphere.

In the illustrative embodiment, the exhaust aftertreatment system 14 includes a plurality of exhaust aftertreatment devices such as, for example, a diesel oxidation catalyst (DOC) 18, a diesel particulate filter (DPF) 20, and a selective catalytic reduction unit (SCR) 22, a reducing agent mixer 24, and a heating system 26. The exhaust gases pass through or by each of the aftertreatment devices to remove or reduce different effluents. The reducing agent mixer 24 is mounted upstream of the SCR and is configured to inject and mix a reducing agent, illustratively a urea solution, into the exhaust gases. Chemical reaction of the reducing agent with the exhaust gases occurs in downstream of the reducing agent mixer 24 in the SCR 20 to reduce NOx before the exhaust gases are released in the atmosphere. The heating system 26 is configured to manage temperatures in the exhaust aftertreatment system 14.

Figure 2:
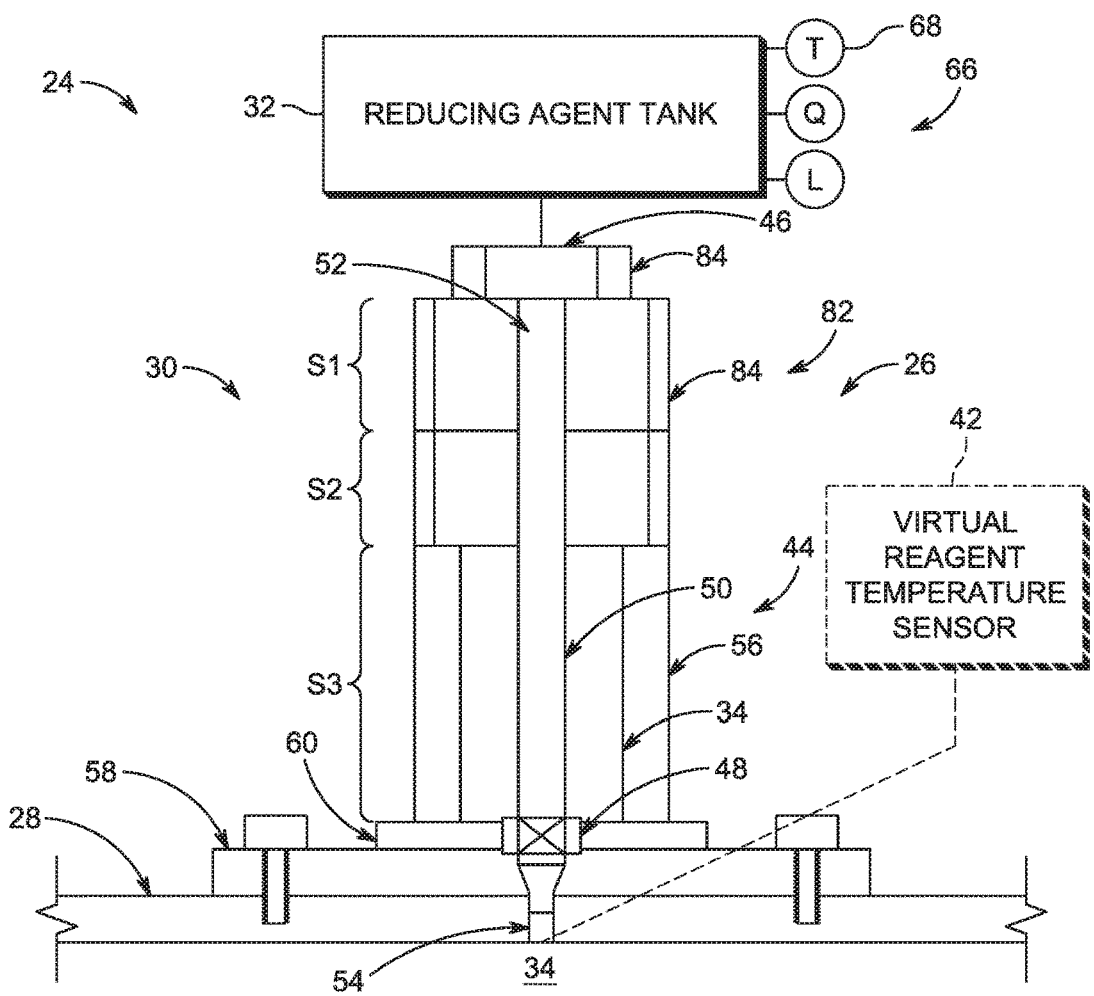
FIG. 2 is a diagrammatic view of the reducing agent mixer in accordance with the present disclosure showing the reducing agent mixer includes a mixing can for receiving the exhaust gases and a flash-boil doser mounted to the mixing can and configured to inject the reducing agent at a predetermined flow rate into the mixing can, and further showing the heating system provides a virtual reagent temperature sensor configured to determine the virtual temperature of the reducing agent injected by the flash-boil doser.
Figure 3:
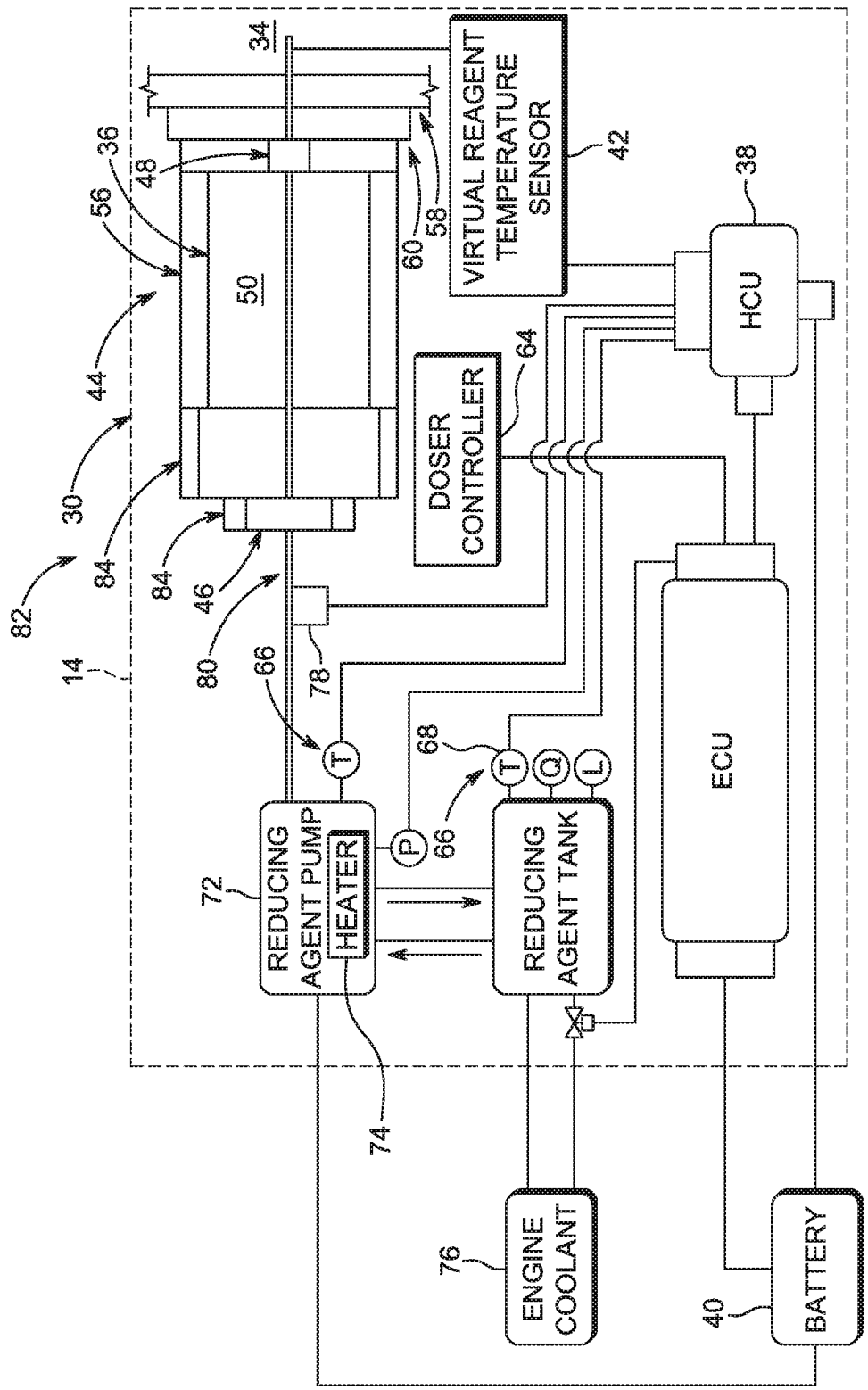
FIG. 3 is a diagrammatic view of exhaust aftertreatment system showing the heating system further includes a heater 36 arranged in the flash-boil doser to heat the reducing agent in the doser and a heating system controller 38 coupled to the heater 36 and configured to direct the heater 36 to selectively apply heat to the reducing agent in the flash-boil doser depending upon the virtual temperature of the reducing agent.
Figure 4:
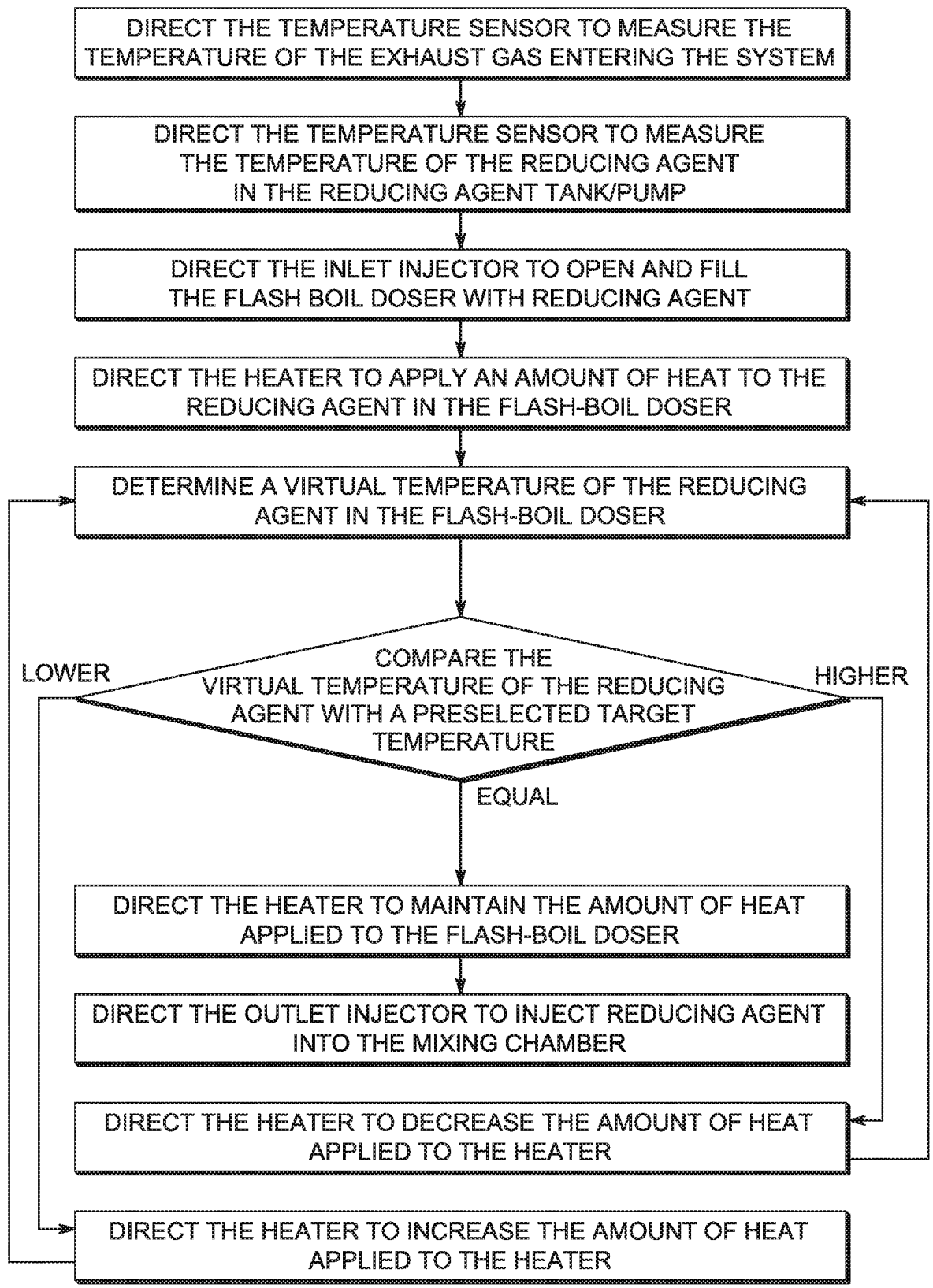
FIG. 4 is a diagrammatic view of an exhaust aftertreatment process showing that the process includes directing temperatures sensors to measure outside parameters of system, determining a virtual temperature of the reducing agent in the doser, determining a corresponding flow rate of the reducing agent base at least in part on the virtual temperature, comparing the corresponding flow rate with a predetermined flow rate; and directing the heater 36 to selectively apply heat to the reducing agent in the doser based on the comparison.

The reducing agent mixer 24 includes a mixing can 28 and a flash-boil doser 30 as shown in FIGS. 2 and 3. The mixing can 28 is coupled fluidly with the exhaust passageway 16 to receive the exhaust gases flowing there through. The reducing agent is stored on the vehicle 10 in a reducing agent tank 32 included in the exhaust aftertreatment system 14 and is conducted to the flash-boil doser 30 for heating prior to being discharged by the flash-boil doser 30 into a mixing chamber 34 defined by the mixing can 28. The flash-boil doser 30 is configured to inject reducing agent into the mixing can 28 at a predetermined flow rate with each injection pulse.

The heating system 26 includes at least one heating element 36 and a heating system controller 38 as shown in FIGS. 2 and 3. The heating element or heater 36 is arranged within the flash-boil doser 30 and configured to heat the reducing agent in the flash-boil doser 30. The heating system controller 38 is coupled to the heater 36 and configured to determine a virtual temperature of the reducing agent injected by the flash-boil doser 30. In the illustrative embodiment, the heating system 26 further includes a battery 40 coupled to the heater 36 that is configured to supply power to the heater 36 to cause the heater 36 to apply heat to the reducing agent in the doser 30.

Accurate and reliable temperature measurements of the temperature of the reducing agent from the doser 30 may be important for determining an accurate flow rate of the reducing agent injected by the doser 30. In some embodiments, a physical temperature sensor may be included in the flash-boil doser 30 to measure the temperature of the reducing agent injected by the flash-boil doser 30, ensuring an accurate amount of reducing agent is injected into the exhaust passageway 16. However, incorporating a physical temperature sensor in the flash-boil doser 30 may be difficult to manufacture and may result in potential leak paths for the reducing agent inside the doser 30.

Therefore, the heating system controller 38 is configured to determine the virtual temperature of the reducing agent based on measured input parameters outside the flash-boil doser 30 so as to provide a virtual reagent temperature sensor 42 as shown in FIGS. 2 and 3. The heating system controller 38 is then configured to direct the heater 36 to selectively apply heat to the reducing agent in the flash-boil doser 30 depending upon the virtual temperature to help better control the system 14.

In this way, the temperature of the reducing agent within the flash-boil doser 30 may be determined without a physical temperature sensor within the doser 30 to measure the temperature. The virtual temperature may also be more reliable than a temperature measured by a physical temperature sensor, allowing better control the flow rate of the reducing agent from the doser 30. The virtual reagent temperature sensor 42 may also eliminate any potential leak paths in the flash-boil doser 30, reduce manufacturing costs, and improve the durability and reliability of the flash-boil doser 30.

To accurately control the amount of reducing agent metered or injected, heating system controller 38 is configured to direct the heater 36 to apply heat to the reducing agent in the flash-boil doser 30 to raise or maintain the virtual temperature of the reducing agent to a preselected target temperature. The preselected target temperature is In the illustrative embodiment, the preselected target temperature is about 160 degrees Celsius. In other embodiments, the preselected target temperature may be between about 140 degrees Celsius and about 180 degrees Celsius.

In the illustrative embodiment, the heating system controller 38 is also configured to direct the heater 36 to reduce the heat applied to the reducing agent in the flash-boil doser 30 to lower the virtual temperature of the reducing agent to the preselected target temperature. In some embodiments, the heating system controller 38 is configured to anticipate the virtual temperature of the reducing agent in the flash-boil doser 30 to be greater than the preselected target temperature and direct the heater 36 to reduce the heat applied to the reducing agent in the flash-boil doser 30. The heating system controller 38 is also configured to anticipate the virtual temperature of the reducing agent in the flash-boil doser 30 to be less than the preselected target temperature and direct the heater 36 to increase the heat applied to the reducing agent in the flash-boil doser 30.

In some embodiments, the heating system controller 38 is configured to determine a trend of the virtual temperature of the reducing agent in the flash-boil doser 30 over a preselected period of time. In the illustrative embodiment, the preselected period of time may be from when the internal combustion engine 12 is started to the present time. In other embodiments, the preslected period of time may be about 5 minutes during operation of the vehicle 10. In other embodiments, the preselected period of time may be between about 5 minute and 30 minutes during operation of the vehicle 10. In other embodiments, another suitable preselected period of time may be used.

Based at least in part on the trend of the virtual temperature of the reducing agent determined by the heating system controller 38, the heating system controller 38 is configured to direct the heater 30 to raise or lower the amount of heat applied to the reducing agent in the flash-boil doser 30. If the trend shows the virtual temperature of the doser 30 increasing over time, the heating system controller 38 may direct the heater 36 to reduce or stop applying heat to the reducing agent in the doser 38. Similarily, if the trend shows the virtual temperature of the doser 30 decreasing over time, the heating system controller 38 may direct the heater 36 to increase applying heat to the reducing agent in the doser 38.

In the illustrative embodiments, the flow rate of the reducing agent injected by the doser 30 is used by the heating system controller 38 to control the temperature of the system 14. Therefore, the heating system controller 38 is also configured to determine a corresponding flow rate of the reducing agent based at least in part on the virtual temperature. The flow rate of the reducing agent is a function of temperature, so based on the virtual temperature, the corresponding flow rate may be determined. The heating system controller 38 is configured to compare the corresponding flow rate to the predetermined flow rate and direct the heater 36 to selectively apply an amount of heat to the reducing agent in the flash-boil doser 30 based at least in part on the corresponding flow rate.

In illustrative embodiments, the heating system controller 38 is configured to direct the heater 36 to increase the amount of heat applied to the reducing agent in the flash-boil doser 30 when the corresponding flow rate is greater than the predetermined flow rate. The heating system controller 38 is then configured to determine a new virtual temperature of the reducing agent in the flash-boil doser 30. The heating system controller 38 is configured to determine the corresponding flow rate of the reducing agent based on the new virtual temperature and compare the corresponding flow rate to the predetermined flow rate.

In the illustrative embodiments, the heating system controller 38 is configured to direct the heater 36 to decrease the amount of heat applied to the reducing agent in the flash-boil doser 30 when the corresponding flow rate is less than the predetermined flow rate. The heating system controller 38 is then configured to determine a new virtual temperature of the reducing agent in the flash-boil doser 30. The heating system controller 38 is configured to determine the corresponding flow rate of the reducing agent based on the new virtual temperature and compare the corresponding flow rate to the predetermined flow rate.

In the illustrative embodiments, the heating system controller 38 is configured to direct the heater 36 to maintain the amount of heat applied to the reducing agent in the flash-boil doser 30 when the corresponding flow rate is equal to the predetermined flow rate.

Turning again to the flash-boil doser 30 includes a doser body 44, a doser inlet injector 46, and a doser outlet injector 48. The doser body 44 defines a flash-boil chamber 50. The heater 36 is arranged in the flash-boil chamber 50 to heat reducing agent and thereby increase a pressure within the flash-boil chamber 50. The doser inlet injector 46 is coupled to the doser body 44 and defines an inlet passageway 52 that opens into the flash-boil chamber 50 to admit reducing agent from the reducing agent tank. The doser outlet injector 48 is coupled to the doser body 44 and defines an outlet passageway 54 that opens from the flash-boil chamber 50 into the mixing chamber 34 of the mixing can 28 and, hence, the exhaust passageway 16.

The doser body 44 includes a housing 56, a base plate 58, and an insulation gasket 60 as shown in FIGS. 2 and 3. The housing 56 defines the flash-boil chamber 50. The base plate 58 is coupled to the mixing can 28 so that the doser 30 is aligned with an injection aperture 62 formed in the mixing can 28. The insulation gasket 60 is positioned between the doser body 44 and the base plate 58 to seal therebetween.

In the illustrative embodiment, the exhaust aftertreatment system 14 further includes a doser controller 64 as shown in FIG. 3. The doser controller 64 is configured to open and close the doser inlet injector 46 and the doser outlet injector 48 based at least in part on the virtual temperature.

The doser controller 64 is also configured to determine the predetermined flow rate. The predetermined flow rate may be based on the amount of exhaust gases flowing into the system 14 or the temperature of the exhaust gases. Therefore, the doser controller may be configured to predetermine the predetermined flow rate based on the parameters to ensure enough reducing agent is injected and mixed with the exhaust gases.

To determine the virtual temperature of the reducing agent injected by the doser 30, the heating system controller 38 is configured to thermally model the flash-boil doser 30, considering the flash-boil doser 30 as the system and modeling the heat transfer into, out of, and within the flash-boil doser 30. To model the heat transfer of the system, the flash-boil doser 30 divided into three different sections S1, S2, S3.

For each of these sections S1, S2, S3, the heat transfer into, out of, and within the section is considered. Each of the sections S1, S2, S3 is divided into a plurality of slices, and the heating system controller 38 is configured to determine the total heat transfer of each slice. In some embodiments, the flash-boil doser 30 may be modeled by dividing the doser 30 into less than three sections. In other embodiments, the flash-boil doser 30 may be modeled by dividing the doser 30 into more than three sections.

In the first section S1, or the no heater section S1, the total heat transfer into and out of the system or doser 30 includes the heat transfer through each slice, the heat transfer from the injectors 46, 48 into the slices, the heat transferred between the reducing agent and the material of the doser 30, and the convective/emissive heat transfer between the slices and the ambient air. The heating system controller 38 is then configured to determine the next virtual temperature of the slices using the current temperature of the slices, the total heat transfer of the slices, the mass of the slices, and the specific heat of the slices.

In the second section S2, or the middle section S2, the total heat transfer into and out of the doser 30 includes the heat transfer through each slice, the heat transfer from the base plate 58 to the second section S2 of the doser 30, the heat transfer between the reducing agent and the material of the doser 30, and the convective/emissive heat transfer between the slices and the ambient air. The heating system controller 38 is then configured to determine the next virtual temperature of the slices using the current temperature of the slices, the total heat transfer of the slices, the mass of the slices, and the specific heat of the slices.

In the third section S3, or the heater section S3, the total heat transfer into and out of the doser 30 includes the heat transfer through each slice, the heat transfer from the base plate 58 to the third section S3 of the doser 30, the heat transfer between the reducing agent and the material of the doser 30, and the heat transfer to each slice from the heater 36. For the last slice, the heat transfer also includes the convective/emissive heat transfer between the doser 30 and the exhaust gas.

The heating system controller 38 is then configured to determine the next virtual temperature of the slices using the current temperature of the slice, the total heat transfer of the slice, the mass of the slices, and the specific heat of the slices. The total heat transfer for the last slice includes the convective/emissive heat transfer between the doser 30 and the exhaust gas.

In the illustrative embodiment, the heating system controller 38 is also configured to model the insulation gasket 60. For the insulation gasket 60, the total heat transfer includes the heat transfer through each of the slices. The heating system controller 38 is then configured to determine the next virtual temperature of the slices using the current temperature of the slices, the total heat transfer of the slices, the thermal heat conductivity of the material forming the gasket, and the length of each slice.

In the illustrative embodiment, the heating system controller 36 is also configured to model the base plate 58 for the virtual reagent temperature sensor 42. For the base plate 58 the total heat transfer includes the convective/emissive heat transfer between the base plate 58 and the surroundings and the heat transferred from the exhaust gas in the exhaust conduit to the base plate 58. The heating system controller 38 is then configured to determine the next virtual temperature of the slices using the current temperature of the slices, the total heat transfer of the slices, the mass of the slices, and the specific heat of the slices.

The heating system controller 38 is configured to determine the overall virtual temperature of the reducing agent in the doser 30. The inputs include the known mass of the reducing agent in the flash-boil chamber 50, the known mass of the reducing agent injected into the mixing can, the average virtual temperature of the reducing agent in the flash-boil chamber 50 before injection into the mixing can 28, and the temperature of the reducing agent injected into the doser 30. The heating system controller 38 is configured to determine the average virtual temperature of the reducing agent in the flash-boil chamber 50 from the next virtual temperatures determined for each section S1, S2, S3 of the model for the system 30.

To determine the inputs for determining the virtual temperature of the reducing agent, the heating system 26 further includes a plurality of sensors 66 as shown in FIGS. 1-3. The plurality of sensors includes a first temperature sensor 68 and a second temperature sensor 70 as shown in FIGS. 1-3. The first temperature sensor 68 is coupled to the reducing agent tank 32 and configured to measure the temperature of the reducing agent in the reducing agent tank 32 before it is conducted to the doser 30. The second temperature sensor 70 is coupled to the exhaust conduit 17 and configured to measure the temperature of the flow of exhaust gases in the exhaust conduit 17. In some embodiments, the plurality of sensors 66 may include pressure sensors, flow rate sensors, fluid level sensors, etc.

The heating system controller 38 is configured to direct the temperature sensors 68, 70 to measure the temperature of the reducing agent in the reducing agent tank 32 and the temperature of the exhaust gases. The heating system controller 38 is further configured to input the measured temperatures into the model to determine the virtual temperature of the reducing agent.

Other known or constant inputs of the system include the thermal heat conductively of the materials of the different components of the doser 30, the heat transfer coefficients of the materials of the different components of the doser 30, and the emissivity of the materials of the different components of the doser 30. Additionally, the dimensions of the doser 30, such as the length, volume, cross-section area, weight etc. are also known inputs.

In the illustrative embodiment, the exhaust aftertreatment system 14 further includes a reducing agent pump 72 as shown in FIG. 3. The reducing agent pump 72 is configured to displace reducing agent stored in the reducing agent tank 32 to the flash-boil doser 30. Unused reducing agent may be returned to the reducing agent tank 32. A pre-heater 74 is coupled to the reducing agent pump 72 and is configured to selectively heat the reducing agent displaced from the reducing agent tank 32 before the reducing agent reaches the flash-boil doser 30. Engine coolant 76 may be routed to the reducing agent tank 32 to cool returned, pre-heated reducing agent. An additional pre-heater 78 is coupled to a line 80 used to transfer the displaced reducing agent from the reducing agent pump 72 to the flash-boil doser 30.

In some embodiments, the heating system controller 38 may be configured to direct one of the pre-heaters 74, 78 to selectively apply an amount of heat applied to the reducing agent in one of the reducing agent pump 72 and the line 80 based on the virtual temperature of the reducing agent determined by the virtual reagent temperature sensor 42. The heating system controller 38 may be configured to direct one of the heaters 74, 78 to increase the amount of heat applied to the reducing agent when the corresponding flow rate is greater than the predetermined flow rate.

Additionally, the heating system controller 38 may be configured to direct one of the heaters 74, 78 to decrease the amount of heat applied to the reducing agent when the corresponding flow rate is less than the predetermined flow rate. In the illustrative embodiments, the heating system controller 38 is configured to direct the heaters 74, 78 to maintain the amount of heat applied to the reducing agent when the corresponding flow rate is equal to the predetermined flow rate.

In some embodiments, the flash-boil doser 30 may further include a cooling system 82 configured to selectively cool the temperature of select components included in the flash-boil doser 30. The cooling system 82 includes at least one cooling element 84 coupled to a portion of the doser 30, i.e. one or all of the doser body 44, the doser inlet injector 46, and the doser outlet injector 48.

In some embodiments, the cooling elements 84 may be embodied as a ducts that hold and circulate a coolant fluid therethrough to cause heat transfer between the flash-boil doser 30 and the coolant fluid. The ducts of each cooling element 84 may be sized according to an amount of thermal heat transfer desired at each location. Optionally, the cooling elements 84 may be a fan, a thermoelectric cooler, or another suitable cooling element.

In the illustrative embodiment, the heating element 36 is an electric heater 36. Optionally, the heating element 36 may be embodied as an exhaust shroud that diverts hot exhaust gases from the exhaust passageway 16 to the flash-boil doser 30. The heater 36 may be fluidly coupled to the exhaust passageway 16 to receive hot exhaust gases that drive heating of the reducing agent resident in the flash-boil chamber 50. The heating control system 38 may be configured to adjust at least one valve to modulate the flow of hot exhaust gases from the exhaust passageway 16 to the heater 36 in order to manipulate operation of the heater 36 of the flash-boil doser 30. In other embodiments, the heating element 36 may optionally be a ceramic heater, a resistive heater, or another suitable heating element 36.

In some embodiments, the heating system controller 38 may be further configured to direct the cooling element 84 in the cooling system 82 to apply cold to the reducing agent in the doser 30 when the corresponding flow rate is less than the predetermined flow rate. In other embodiments, the heating system controller 38 may be configured to direct the cooling element 84 in the cooling system 82 to apply coolant to one of the doser body 44, the inlet injector 46, and the outlet injector 48 when the corresponding flow rate is less than the predetermined flow rate. The heating system controller 38 is then configured to determine a new virtual temperature of the reducing agent in the flash-boil doser 30. The heating system controller 38 is configured to determine the corresponding flow rate of the reducing agent based on the new virtual temperature and compare the corresponding flow rate to the predetermined flow rate.

A method of treating exhaust gases using the aftertreatment system 14 may include several steps. The method may include directing the temperature sensors to measure the temperature of the reducing agent in the reducing agent tank 32 or the reducing agent pump 72. The method may also include directing the temperature sensors to measure the temperature of the exhaust gases entering the system 14.

To begin treating the exhaust gases, the reducing agent is injected into the doser 30 by the inlet injector 46. The heater 36 is then directed by the heating system controller 38 to apply an amount of heat to the reducing agent in the doser 30.

While the heater applies heat to the reducing agent inside the doser 30, the heating system controller determines the virtual temperature of the reducing agent in the flash-boil doser 30 using the virtual reagent temperature sensor 42. The heating system controller 38 uses the measured temperature values and other constant inputs to determine the virtual temperature.

Once the virtual temperature is determined, the heating system controller 38 directs the heater 36 to selectively apply heat to the reducing agent in the flash-boil doser 30 to maintain the reducing agent in the doser 30 at a preselected temperature. As such, the heating system controller 38 is configured to direct the heater to apply heat to the reducing agent in the doser 30 to raise or maintain the virtual temperature of the reducing agent to the preselected target temperature when the virtual temperature of the reducing agent is below the preselected target temperature. If the virtual temperature of the reducing agent determined by the virtual temperature sensor 42 is above the preselected target temperature, the heating system controller 38 directs the heater 36 to reduce the heat applied to the reducing agent in the flash-boil doser 30 to lower the virtual temperature of the reducing agent to the preselected target temperature.

In some embodiments, the heating system controller 38 anticipates the virtual temperature of the reducing agent in the flash-boil doser 30 to be greater than the preselected target temperature and directs the heater 36 to reduce the heat applied to the reducing agent in the flash-boil doser 30. Additionally, the heating system controller 38 also anticipates the virtual temperature of the reducing agent in the flash-boil doer 30 to be less than the preselected target temperature and directs the heater 36 to increase the heat applied to the reducing agent in the flash-boil doser 30.

the heating system controller 38 determines a corresponding flow rate of the reducing agent to be injected into the mixing can 28. The corresponding flow rate is then compared to the predetermined flow rate. Based on the comparison, the heating system controller 38 directs the heater 36 to selectively change the amount of heat applied to the reducing agent in the doser 30 based on the corresponding flow rate.

If the corresponding flow rate is less than the predetermined flow rate, then the heating system controller 38 directs the heater 36 to decrease the amount of heat applied to the doser. Then, the heating system controller 38 determines or recalculates a new virtual temperature of the reducing agent in the doser and determines the corresponding flow rate.

If the corresponding flow rate is greater than the predetermined flow rate, then the heating system controller 38 directs the heater 36 to increase the amount of heat applied to the doser 30. Then, the heating system controller 38 determines or recalculates a new virtual temperature of the reducing agent in the doser and determines the corresponding flow rate.

These steps may be repeated until the corresponding flow rate is equal to the predetermined flow rate. If the flow rates are equal, then the heating system controller 38 directs the heater 36 to maintain the amount of heat applied to the flash-boil doser and directs the outlet injector 48 to inject the reducing reagent into the mixing can 28.

The following numbered clauses include embodiments that are contemplated and non-limiting:

Clause 1. An exhaust gas aftertreatment system for dosing reducing agent into an exhaust stream, the system comprising an exhaust conduit defining an exhaust passageway for receiving a flow of exhaust gases therein, a reducing agent mixer fluidly coupled to the exhaust conduit and configured to receive the exhaust gases and inject a reducing agent into the exhaust gases, the reducing agent mixer including a mixing can defining at least a portion of the exhaust passageway for receiving the exhaust gases therein and a flash-boil doser mounted to the mixing can and configured to inject the reducing agent at a predetermined flow rate through an injection aperture formed in the mixing can, and a heating system configured to manage temperatures within the flash-boil doser, the heating system including a heater arranged within the flash-boil doser and configured to heat the reducing agent in the flash-boil doser and a heating system controller coupled to the heater.

Clause 2. The system of clause 1, any other suitable clause, or any combination of clauses, wherein the heating system controller is configured to determine a virtual temperature of the reducing agent injected by the flash-boil doser based on measured input parameters outside the flash-boil doser so as to provide a virtual reagent temperature sensor.

Clause 3. The system of clause 2, any other suitable clause, or any combination of clauses, wherein the heating system is configured to direct the heater to selectively apply heat to the reducing agent in the flash-boil doser depending upon the virtual temperature of the reducing agent.

Clause 4. The system of clause 3, any other suitable clause, or any combination of clauses, wherein the heating system controller is configured to direct the heater to apply heat to the reducing agent in the flash-boil doser to raise or maintain the virtual temperature of the reducing agent to a preselected target temperature when the virtual temperature of the reducing agent is less than the preselected target temperature.

Clause 5. The system of clause 4, any other suitable clause, or any combination of clauses, wherein the heating system controller is configured to direct the heater to reduce the heat applied to the reducing agent in the flash-boil doser to lower the virtual temperature of the reducing agent to the preselected target temperature when the virtual temperature of the reducing agent is greater than the preselected target temperature.

Clause 6. The system of clause 5, any other suitable clause, or any combination of clauses, wherein the heating system controller is configured to anticipate the virtual temperature of the reducing agent in the flash-boil doser to be greater than the preselected target temperature and direct the heater to reduce the heat applied to the reducing agent in the flash-boil doser.

Clause 7. The system of clause 5, any other suitable clause, or any combination of clauses, wherein the heating system controller is configured to anticipate the virtual temperature of the reducing agent in the flash-boil doer to be less than the preselected target temperature and direct the heater to increase the heat applied to the reducing agent in the flash-boil doser.

Clause 8. The system of clause 3, any other suitable clause, or any combination of clauses, wherein the heating system controller is configured to determine a trend of the virtual temperature of the reducing agent in the flash-boil doser over a preselected period of time and direct the heater to raise or lower the amount of heat applied to the reducing agent in the flash-boil doser based at least in part on the trend of the virtual temperature of the reducing agent over the preselected period of time.

Clause 9. The system of clause 3, any other suitable clause, or any combination of clauses, wherein the heating system controller is configured to determine a corresponding flow rate of the reducing agent based at least in part on the virtual temperature.

Clause 10. The system of clause 9, any other suitable clause, or any combination of clauses, wherein the heating system controller is configured to compare the corresponding flow rate to the predetermined flow rate and direct the heater to selectively apply an amount of heat to the reducing agent in the flash-boil doser based at least in part on the corresponding flow rate.

Clause 11. The system of clause 10, any other suitable clause, or any combination of clauses, wherein the heating system controller is configured to direct the heater to increase the amount of heat applied to the reducing agent in the flash-boil doser when the corresponding flow rate is greater than the predetermined flow rate.

Clause 12. The system of clause 10, any other suitable clause, or any combination of clauses, wherein the heating system controller is configured to direct the heater to decrease the amount of heat applied to the reducing agent in the flash-boil doser when the corresponding flow rate is less than the predetermined flow rate.

Clause 13. The system of clause 10, any other suitable clause, or any combination of clauses, wherein the heating system controller is configured to direct the heater to maintain the amount of heat applied to the reducing agent in the flash-boil doser when the corresponding flow rate is equal to the predetermined flow rate.

Clause 14. The system of clause 3, any other suitable clause, or any combination of clauses, wherein the flash-boil doser includes (i) a doser body that defines a flash-boil chamber with the heater arranged in the flash-boil chamber to heat reducing agent and thereby increase a pressure within the flash-boil chamber, (ii) a doser inlet injector coupled to the doser body that defines an inlet passageway that opens into the flash-boil chamber to admit reducing agent from an associated reducing agent tank, and (iii) a doser outlet injector coupled to the doser body that defines an outlet passageway that opens from the flash-boil chamber into the exhaust passageway of the mixing can.

Clause 15. The system of clause 14, any other suitable clause, or any combination of clauses, wherein the exhaust aftertreatment system further includes a doser controller configured to open and close the doser inlet injector and the doser outlet injector based at least in part on the virtual temperature.

Clause 16. The system of clause 3, any other suitable clause, or any combination of clauses, wherein the exhaust aftertreatment further includes a reducing reagent tank fluidly coupled to the flash-boil doser and configured to store the reducing agent therein.

Clause 17. The system of clause 16, any other suitable clause, or any combination of clauses, wherein the heating system further includes a first temperature sensor coupled to the reducing agent tank and configured to measure the temperature of the reducing agent in the reducing agent tank and a second temperature sensor coupled to the exhaust conduit and configured to measure the temperature of the flow of exhaust gases in the exhaust conduit.

Clause 18. An over-the-road vehicle comprising
an internal combustion engine configured to produce a flow of exhaust gases that are conducted through an exhaust passageway, and
an exhaust aftertreatment system configured to treat the flow of exhaust gases.

Clause 19. The over-the-road vehicle of clause 18, any other suitable clause, or any combination of clauses, wherein the exhaust aftertreatment system comprises
a mixing can defining at least a portion of the exhaust passageway for receiving the flow of exhaust gases therein,
a doser mounted to the mixing can and configured to inject a reducing agent at a predetermined flow rate through an injection aperture formed in the mixing can, and
a heating system configured to manage temperatures within the doser, the heating system including a heater arranged within the doser and configured to heat the reducing agent in the doser and a heating system controller coupled to the heater.

Clause 20. The over-the-road vehicle of clause 19, any other suitable clause, or any combination of clauses, wherein the heating system controller is configured to determine a virtual temperature of the reducing agent injected by the doser based on measured input parameters outside the doser so as to provide a virtual reagent temperature sensor.

Clause 21. The over-the-road vehicle of clause 20, any other suitable clause, or any combination of clauses, wherein the heating system is configured to direct the heater to selectively apply heat to the reducing agent in the doser depending upon the virtual temperature of the reducing agent.

Clause 22. The over-the-road vehicle of clause 21, any other suitable clause, or any combination of clauses, wherein the heating system controller is configured to determine a corresponding flow rate of the reducing agent based at least in part on the virtual temperature, compare the corresponding flow rate to the predetermined flow rate, and direct the heater to selectively apply heat to the reducing agent in the doser based at least in part on the corresponding flow rate.

Clause 23. The system of clause 21, any other suitable clause, or any combination of clauses, wherein the heating system controller is configured to direct the heater to apply heat to the reducing agent in the flash-boil doser to raise or maintain the virtual temperature of the reducing agent to a preselected target temperature when the virtual temperature of the reducing agent is less than the preselected target temperature.

Clause 24. The system of clause 23, any other suitable clause, or any combination of clauses, wherein the heating system controller is configured to direct the heater to reduce the heat applied to the reducing agent in the flash-boil doser to lower the virtual temperature of the reducing agent to the preselected target temperature when the virtual temperature of the reducing agent is greater than the preselected target temperature.

Clause 25. The system of clause 24, any other suitable clause, or any combination of clauses, wherein the heating system controller is configured to anticipate the virtual temperature of the reducing agent in the flash-boil doser to be greater than the preselected target temperature and direct the heater to reduce the heat applied to the reducing agent in the flash-boil doser.

Clause 25. The system of clause 25, any other suitable clause, or any combination of clauses, wherein the heating system controller is configured to anticipate the virtual temperature of the reducing agent in the flash-boil doer to be less than the preselected target temperature and direct the heater to increase the heat applied to the reducing agent in the flash-boil doser.

Clause 26. The over-the-road vehicle of clause 22, any other suitable clause, or any combination of clauses, wherein the heating system controller is configured to direct the heater to increase the amount of heat applied to the reducing agent in the doser when the corresponding flow rate is greater than the predetermined flow rate.

Clause 27. The over-the-road vehicle of clause 22, any other suitable clause, or any combination of clauses, wherein the heating system controller is configured to direct the heater to decrease the amount of heat applied to the reducing agent in the doser when the corresponding flow rate is less than the predetermined flow rate.

Clause 28. The over-the-road vehicle of clause 22, any other suitable clause, or any combination of clauses, wherein the heating system controller is configured to direct the heater to maintain the amount of heat applied to the reducing agent in the doser when the predetermined flow rate is equal to the corresponding flow rate.

Clause 29. A method comprising injecting reducing agent into a doser adapted to inject reducing agent into a mixing can coupled to the doser.

Clause 30. The method of clause 29, any other suitable clause, or any combination of clauses, wherein the method further comprises directing a heater coupled to the flash-boil doser to apply an amount of heat to the reducing agent in the doser.

Clause 31. The method of clause 30, any other suitable clause, or any combination of clauses, wherein the method further comprises determining a virtual reagent temperature of the reducing agent in the flash-boil doser using a virtual reagent temperature sensor located outside of the flash-boil doser.

Clause 32. The method of clause 31, any other suitable clause, or any combination of clauses, wherein the method further comprises determining a corresponding flow rate of the reducing agent to be injected into the mixing can, Clause 33. The method of clause 32, any other suitable clause, or any combination of clauses, wherein the method further comprises comparing the corresponding flow rate of the reducing agent to a predetermined flow rate, and Clause 34. The method of clause 33, any other suitable clause, or any combination of clauses, wherein the method further comprises directing the heater to selectively change the amount of heat applied to the reducing agent in the doser based on the corresponding flow rate.

Clause 35. The method of clause 34, any other suitable clause, or any combination of clauses, wherein the method further comprises directing the heater to increase the amount of heat applied to the reducing agent in the doser when the corresponding flow rate is greater than the predetermined flow rate, and determining a new virtual temperature of the reducing agent in the doser.

Clause 36. The method of clause 34, any other suitable clause, or any combination of clauses, wherein the method further comprises directing the heater to decrease the amount of heat applied to the doser when the corresponding flow rate is less than the predetermined flow rate, and determining a new virtual temperature of the reducing agent in the doser.

Clause 37. The method of clause 34, any other suitable clause, or any combination of clauses, wherein the method further comprises directing the heater to maintain the amount of heat applied to the flash-boil doser when the corresponding flow rate is equal to the predetermined flow rate, and injecting the reducing reagent into the mixing can.

Clause 38. The method of clause 31, any other suitable clause, or any combination of clauses, wherein the method further comprises directing the heater to apply heat to the reducing agent in the flash-boil doser to raise or maintain the virtual temperature of the reducing agent to a preselected target temperature when the virtual temperature of the reducing agent is less than the preselected target temperature.

Clause 39. The method of clause 38, any other suitable clause, or any combination of clauses, wherein the method further comprises directing the heater to reduce the heat applied to the reducing agent in the flash-boil doser to lower the virtual temperature of the reducing agent to the preselected target temperature when the virtual temperature of the reducing agent is greater than the preselected target temperature.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An exhaust gas aftertreatment system for dosing reducing agent into an exhaust stream, the system comprising
   an exhaust conduit defining an exhaust passageway for receiving a flow of exhaust gases therein,
   a reducing agent mixer fluidly coupled to the exhaust conduit and configured to receive the exhaust gases and inject a reducing agent into the exhaust gases, the reducing agent mixer including a mixing can defining at least a portion of the exhaust passageway for receiving the exhaust gases therein and a flash-boil doser mounted to the mixing can and configured to inject the reducing agent at a predetermined flow rate through an injection aperture formed in the mixing can, and
   a heating system configured to manage temperatures within the flash-boil doser, the heating system including a heater arranged within the flash-boil doser and configured to heat the reducing agent in the flash-boil doser and a heating system controller coupled to the heater,
   wherein the heating system controller is configured to model heat transfer through the flash-boil doser based on measured input parameters outside the flash-boil doser to determine a virtual temperature of the reducing agent injected by the flash-boil doser at an outlet of the flash-boil doser adjacent to the injection aperture of the mixing can, and wherein the heating system is configured to direct the heater to selectively apply heat to the reducing agent in the flash-boil doser depending upon the virtual temperature of the reducing agent.

2. The exhaust aftertreatment system of claim 1, wherein the heating system controller is configured to direct the heater to apply heat to the reducing agent in the flash-boil doser to raise or maintain the virtual temperature of the reducing agent to a preselected target temperature when the virtual temperature of the reducing agent is less than the preselected target temperature.

3. The exhaust aftertreatment system of claim 2, wherein the heating system controller is configured to direct the heater to reduce the heat applied to the reducing agent in the flash-boil doser to lower the virtual temperature of the reducing agent to the preselected target temperature when the virtual temperature of the reducing agent is greater than the preselected target temperature.

4. The exhaust gas aftertreatment system of claim 3, wherein the heating system controller is configured to anticipate the virtual temperature of the reducing agent in the flash-boil doser to be greater than the preselected target temperature and direct the heater to reduce the heat applied to the reducing agent in the flash-boil doser.

5. The exhaust gas aftertreatment system of claim 3, wherein the heating system controller is configured to anticipate the virtual temperature of the reducing agent in the flash-boil doer to be less than the preselected target temperature and direct the heater to increase the heat applied to the reducing agent in the flash-boil doser.

6. The exhaust gas aftertreatment system of claim 3, wherein the heating system controller is configured to determine a trend of the virtual temperature of the reducing agent in the flash-boil doser over a preselected period of time and direct the heater to raise or lower the amount of heat applied to the reducing agent in the flash-boil doser based at least in part on the trend of the virtual temperature of the reducing agent over the preselected period of time.

7. The exhaust gas aftertreatment system of claim 1, wherein the flash-boil doser includes (i) a doser body that defines a flash-boil chamber with the heater arranged in the flash-boil chamber to heat reducing agent and thereby increase a pressure within the flash-boil chamber, (ii) a doser inlet injector coupled to the doser body that defines an inlet passageway that opens into the flash-boil chamber to admit reducing agent from an associated reducing agent tank, and (iii) a doser outlet injector coupled to the doser body that defines an outlet passageway that opens from the flash-boil chamber into the exhaust passageway of the mixing can.

8. The exhaust gas aftertreatment system of claim 7, wherein the exhaust aftertreatment system further includes a doser controller configured to open and close the doser inlet injector and the doser outlet injector based at least in part on the virtual temperature.

9. The exhaust gas aftertreatment system of claim 1, wherein the exhaust aftertreatment further includes a reducing reagent tank fluidly coupled to the flash-boil doser and configured to store the reducing agent therein.

10. The exhaust gas aftertreatment system of claim 9, wherein the heating system further includes a first temperature sensor coupled to the reducing agent tank and configured to measure the temperature of the reducing agent in the reducing agent tank and a second temperature sensor coupled to the exhaust conduit and configured to measure the temperature of the flow of exhaust gases in the exhaust conduit.

11. An over-the-road vehicle comprising
an internal combustion engine configured to produce a flow of exhaust gases that are conducted through an exhaust passageway, and
an exhaust aftertreatment system configured to treat the flow of exhaust gases, the system comprising
a mixing can defining at least a portion of the exhaust passageway for receiving the flow of exhaust gases therein,
a doser mounted to the mixing can and configured to inject a reducing agent at a predetermined flow rate through an injection aperture formed in the mixing can, and
a heating system configured to manage temperatures within the doser, the heating system including a heater arranged within the doser and configured to heat the reducing agent in the doser and a heating system controller coupled to the heater,
wherein the heating system controller is configured to model heat transfer through the flash-boil doser based on measured input parameters outside the flash-boil doser to determine a virtual temperature of the reducing agent injected by the doser, and wherein the heating system is configured to direct the heater to selectively apply heat to the reducing agent in the doser depending upon the virtual temperature of the reducing agent.

12. The exhaust aftertreatment system of claim 11, wherein the heating system controller is configured to direct the heater to apply heat to the reducing agent in the flash-boil doser to raise or maintain the virtual temperature of the reducing agent to a preselected target temperature when the virtual temperature of the reducing agent is less than the preselected target temperature.

13. The exhaust gas aftertreatment system of claim 12, wherein the heating system controller is configured to direct the heater to reduce the heat applied to the reducing agent in the flash-boil doser to lower the virtual temperature of the reducing agent to the preselected target temperature when the virtual temperature of the reducing agent is greater than the preselected target temperature.

14. The exhaust gas aftertreatment system of claim 13, wherein the heating system controller is configured to anticipate the virtual temperature of the reducing agent in the flash-boil doser to be greater than the preselected target temperature and direct the heater to reduce the heat applied to the reducing agent in the flash-boil doser.

15. The exhaust gas aftertreatement system of claim 13, wherein the heating system controller is configured to anticipate the virtual temperature of the reducing agent in the flash-boil doer to be less than the preselected target temperature and direct the heater to increase the heat applied to the reducing agent in the flash-boil doser.

16. A method comprising
injecting reducing agent into a doser adapted to inject reducing agent into a mixing can coupled to the doser,
directing a heater coupled to the doser to apply an amount of heat to the reducing agent in the doser,
determining heat transfer through the doser based on measured input parameters outside the doser to determine a virtual reagent temperature of the reducing agent injected by the doser,
determining a corresponding flow rate of the reducing agent to be injected into the mixing can,
comparing the corresponding flow rate of the reducing agent to a predetermined flow rate, and
directing the heater to selectively change the amount of heat applied to the reducing agent in the doser based on the corresponding flow rate.

17. The method of claim 16, wherein the method further comprises directing the heater to apply heat to the reducing agent in the doser to raise or maintain the virtual temperature of the reducing agent to a preselected target temperature when the virtual temperature of the reducing agent is less than the preselected target temperature.

18. The method of claim 17, wherein the method further comprises directing the heater to reduce the heat applied to the reducing agent in the doser to lower the virtual temperature of the reducing agent to the preselected target temperature when the virtual temperature of the reducing agent is greater than the preselected target temperature.

* * * * *